United States Patent Office 3,513,339
Patented May 19, 1970

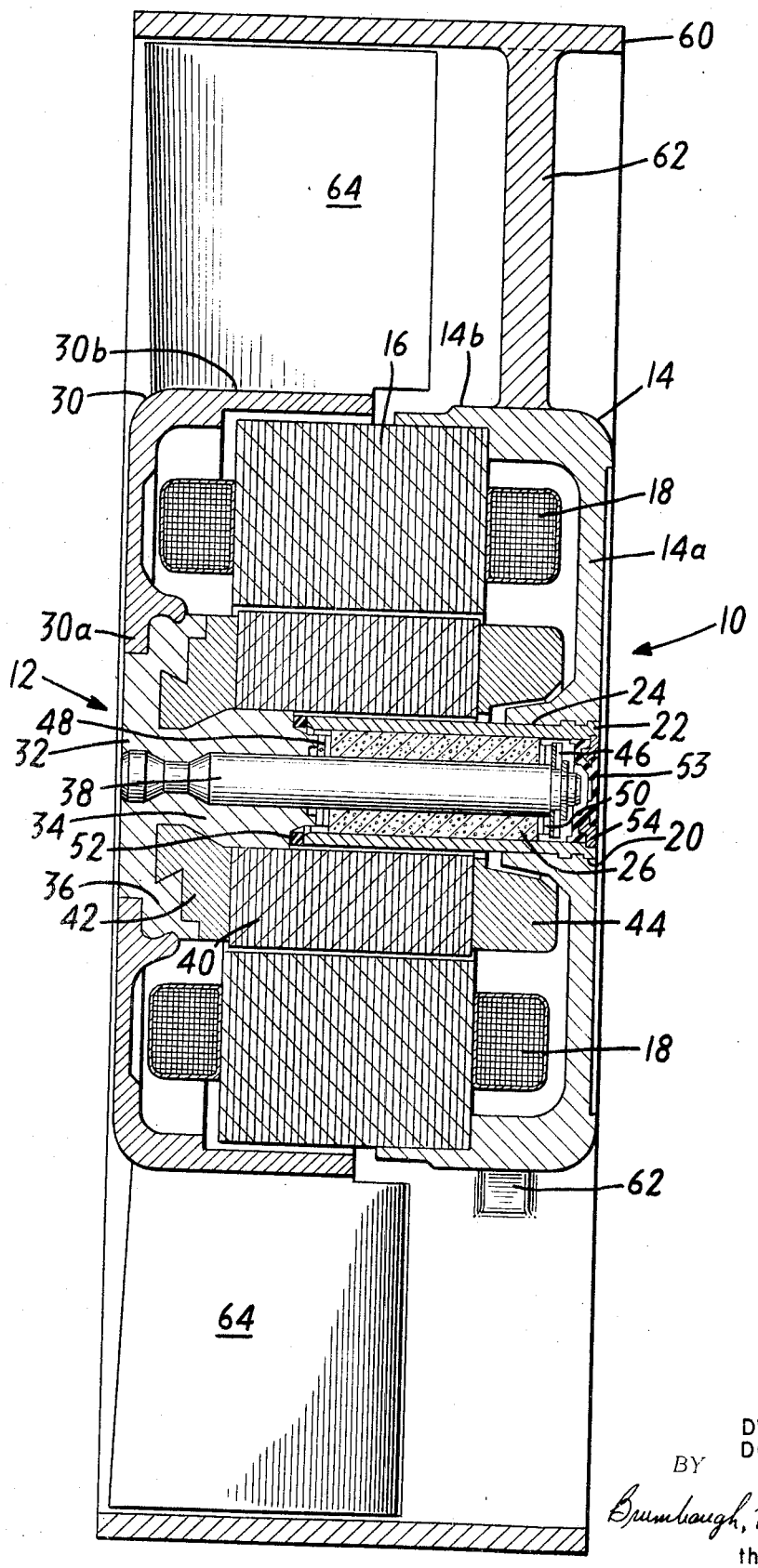

3,513,339
ELECTRIC MOTOR CONSTRUCTION
Dwight E. Harris, Woodstock, and Donald S. Wilson, Elnora, N.Y., assignors to Rotron Manufacturing Company, Inc., Woodstock, N.Y., a corporation of New York
Filed Dec. 7, 1966, Ser. No. 599,855
Int. Cl. H02k 5/16
U.S. Cl. 310—90                                    7 Claims

ABSTRACT OF THE DISCLOSURE

An improved motor construction, particularly adapted for use in tubeaxial fans is described. An annular stator is carried in a housing which also carries a tubular bearing support concentric with the stator. The rotor, also annular in form, is supported in a hub and revolves in the annular space between the tubular bearing support and the stator. The motor shaft is supported cantilever fashion from the rotor hub concentrically with the rotor and is journalled in a sleeve bearing in the bearing support. The annular design and air gap around the bearing support minimize transfer of motor heat to the bearing and thereby extend its life.

---

The present invention relates to electric motors and more particularly to a novel electric motor design incorporating an improved bearing arrangement.

Desirably, fans employed for cooling electronic equipment and other apparatus should occupy minimal space so as to perform their function without significant increase in overall size of the equipment. An important advance toward that goal was the advent of the type of fan wherein the motor is mounted in substantial part within the hub that carries the fan blades. In many such fans, the motor itself is only slightly greater in axial length than the fan blades and the design provides a very favorable relationship between overall fan size and cooling capacity.

However, the motor construction employed in such fans present certain difficulties. The conventional motor arrangement, in which the rotor is assembled directly on the rotating shaft and is surrounded by the stator, employs a relatively small bearing at either end of the shaft to support the rotor. Where overall fan size is reduced, the bearings themselves become of such small axial dimension that it is difficult to maintain their load capacity, especially if they are of the low cost sintered type. Lubricating oil capacity is also lessened, thereby reducing bearing life. In addition, the concentric fan and motor construction present alignment problems.

Some of these disadvantages have been overcome by providing a tubular rotor having a bearing element mounted in a central bore rotating about a cantilever supported stationary shaft. One of the principal difficulties with this arrangement is that the centrifugal forces set up during operation tend to force the lubricant in the rotating bearing element, which may be a sleeve of sintered material, outward and away from its bearing surface. A further difficulty is the higher bearing temperatures resulting from location of the bearing in the motor rotor.

Another type of motor employs a stator portion having a central bore carrying a bearing and an annular rotor surrounding the stator and supported by a shaft which rotates within the bearing in the stator bore. This arrangement eliminates the loss of lubricant by centrifugal forces occurring in the rotating bearing motor, but has some limitations of its own. Primarily, since the rotor must be large to fit around the stator, a substantial amount of power is required to keep it rotating and the relatively large forces necessary to support it impose greater load requirements on the bearings and increase shaft size.

The primary object of the present invention is to provide an improved electric motor construction which avoids the difficulties of the above-described prior art devices.

A further object of the invention is to provide novel and improved electric motor construction particularly adapted for use in a fan.

Still another object of the present invention is to provide an improved motor construction having a simplified bearing arrangement by means of which better bearing cooling is achieved, and a stator-rotor arrangement which minimizes the loading on the shaft.

Briefly, the novel construction of the invention comprises a stator housing incorporating a generally annular stator stack whose outer diameter is essentially the outer diameter of the motor itself, and a tubular bearing support concentric with the stator stack extending from the stator housing. A bearing of any suitable type, such as a sleeve bearing of porous, sintered metal is force fitted within the tubular support.

The rotating portion of the motor includes a cup-shaped rotor hub having an end plate from which a shaft is supported in cantilever fashion, and an annular rotor whose outer diameter is sized to provide the proper air gap with the inner diameter of the stator stack, and whose inner diameter is somewhat greater than that of the tubular bearing support. When assembled, the rotor shaft is properly supported within the bearing and it, together with the rotor structure, revolves on the application of power. The rotor hub is formed with an axially extending side wall carrying fan blades or the like.

The foregoing construction incorporates a stationary bearing, whereby no centrifugal forces are present to carry the lubricant away from the bearing surface, and a relatively small diameter, small mass rotor so that the forces on the shaft and consequently the bearing loading, are minimized. Cooling of the motor is enhanced by the exterior mounting of the stator and the spacing of the rotor bore from the tubular bearing support. An additional substantial cooling effect is achieved by virtue of the high thermal conductivity of the materials of the bearing support and the stator housing.

The foregoing and other objects, features and advantages of the invention will become more apparent from the following detailed description thereof, when taken in conjunction with the single feature of the drawing which is a cross-sectional view of the motor of the invention, as employed to drive a fan.

Turning now to the figure, the motor is seen to include a stator portion indicated generally at 10 and a rotor portion 12. The stator portion includes a housing 14 formed with a flat base section 14a and a cylindrical outer wall 14b. The stator stack 16 is conventional in form, consisting of a plurality of generally annular laminations of iron, and is tightly fitted and cemented within a suitable annular recess provided at the interior of the outer wall 14b. Appropriate stator windings 18 are associated with the stator stack in the usual manner.

Centrally of the base 14a of the housing there is provided a circular opening 20 for receiving the tubular member 22. To rigidly maintain the member 22 in the housing, the latter is formed with an axially extending annular rim 24 for receiving a substantial portion of the member 22, and both the member 22 and the interior surface of the bore 20 may be provided with complementary ridges and grooves to prevent axial movement.

Preferably, the housing 14 and the tubular member 22 are made of a material having a high thermal conductivity, such as aluminum, and may be fastened together such as by force fitting or soldering to assure good thermal conductivity path between them, or they may be integrally cast.

Within the tubular member 22 is mounted a bearing element 26. As shown, this comprises a sleeve of sintered metal, such as bronze, extending along a substantial length of the tubular support. Alternatively, the bearing may consist of two or more ball bearing assemblies or sections of sintered material. However, the sintered sleeve bearing shown is particularly advantageous with the motor design of the present invention because of its low cost and freedom from alignment problems. Such a sleeve bearing 26 has an internal bore sized to receive a suitable shaft and an external diameter such that it is force fitted to be rigidly retained within the tubular support 22.

The rotor portion 12 includes a generally cup-shaped hub 30 having a circular end wall 30a and a cylindrical side wall 30b. At the center of the end wall 30a there is provided a shaft and rotor supporting section 32. Although this is shown as being a section separate from the remainder of the support 30, it will be understood that it could be formed integrally therewith.

The center section 32 is formed with a pair of concentric axial sleeve 34, 36, the latter outer sleeve having an axial length somewhat less than the inner sleeve 34. The inner sleeve 34 has an axial bore designed to make a tight fit with a shaft 38. Preferably, the shaft is provided with a necked down portion which mates with a suitably shaped internal ridge in the bore of the sleeve 34 to prevent axial movement of the shaft. The section 32 may be formed of a metal or plastic cast about the shaft 38, which ordinarily would be of steel.

The outer sleeve 36 is formed with a series of annular steps on its inner wall to enable it to firmly engage the rotor, as will be described hereinafter.

As seen in the drawing, the inner sleeve 34 extends a substantial distance axially from the end wall of the support so that the shaft 38 is firmly supported over a significant portion of its length, but in cantilever fashion.

The rotor structure includes the conventional laminated stack 40 through which the rotor conductors or bars extend. The end rings 42, 44 may be cast of a metal, such as aluminum, together with the rotor bars in conventional fashion. The end ring 42 is formed with a plurality of annular steps to snugly engage the mating surfaces on the interior of the sleeve 36. Thus when assembled, the shaft 38 is held firmly within the sleeve 34, and the annular rotor structure 40, 42, 44 is firmly supported in concentric relation therewith between the inner sleeve 34 and the outer sleeve 36.

With the stator and rotor portions assembled, the shaft 38 extends through the bore in the bearing element 26. To prevent separation of the rotor and stator sections during operation, the free end of the shaft is provided with a groove for engagement with a retaining element such as snap ring 46. Thrust washers 48 are provided between the end of the inner sleeve 34 and the adjacent end of the bearing element 26, and a similar pair of thrust washers 50 are disposed between the other end of the bearing element and the retaining ring 46.

Between the free end of the tubular bearing support 22 and an opposed shoulder on the sleeve 34 there is preferably provided a sealing ring 52 to reduce the escape of lubricant from the bearing area to the interior of the motor structure. The sealing ring may be formed of a compressible closed pore material such as urethane foam and is compressed when the motor is assembled.

The central opening in the stator housing 14 is sealed against dirt and dust by means of a rubber plug 53 supported on a rigid ring 54 which is arranged to snap or screw firmly into the open end of the tubular support 22. Thus, the bearing surfaces are completely sealed off to prevent the escape of lubricant and the entry of undesired foreign matter.

When used in a fan embodiment, a venturi ring 60 may be supported in concentric relation to the startor hub 14 by means of a plurality of radial spokes or arms 62. The fan blades 64 may be fastened to or cast integrally with the cylindrical side wall of the rotor support 30.

Upon application of electrical power to the stator winding 18 by means of leads (not shown) the rotor portion 14 revolves to set the fan blades in motion. As will be seen, the shaft 38 rotates within the stationary bearing 26 so that the lubricant in the bearing is not subjected to centrifugal forces. The rotor stack 40 and end rings 42, 44 rotate along with the shaft around the bearing support 22 and within the stator stack 16.

The bearing structure is protected from the heat generated by the rotor by the gap between the rotor stack and the bearing support 22. The latter being of a highly thermally conductive material transfers heat rapidly to the stator housing 14 which acts as a heat sink, extending up into the main air stream created by the blades 64.

The thermal characteristics of the motor are further enhanced by locating the stator stack and coils, which generate a substantial amount of heat, (particularly in a shaded pole construction) at the motor periphery, from where the heat may be dissipated more readily.

The use of the tubular bearing support 22 provides excellent accuracy control for the sleeve bearing and provides excellent mechanical support for the rotor structure. By properly designing the motor components, the center of gravity can be located substantially at the end of the bearing adjacent the sleeve 34, thereby reducing to minimum value the bending moments on the shaft 38. As a result, the shaft 38 may be made relatively small in diameter.

The foregoing design also permits a relatively large mass of bearing material to be used, this characteristic enabling it to hold a relatively large lubricant supply. The need for relubrication therefore is minimized but when necessary, this can be accomplished easily by removing the end cap, 53, 54 and inserting the lubricant material, or by piercing the rubber cap 53 with a hypodermic syringe filled with the liquid lubricant.

There is thus provided a novel motor design in which the overall axial length of the motor is minimized, being not significantly greater than the combined axial length of the fan blade 64 and the venturi supporting spokes 62 with which it is used. The rotor, being of relatively small diameter and mass, avoids the mechanical problems of the prior art motors in which the rotor is the external and rotating element.

It is to be understood that many variations and modifications of the above-described construction will occur to those skilled in the art within the spirit of the invention, and it is intended that the invention be limited only by the scope of the appended claims.

What is claimed is:

1. An electric motor construction of reduced axial length comprising a stator housing, an annular stator carried by said stator housing, a relatively thin walled tubular bearing support extending axially from said housing concentrically within said stator, said bearing support having a uniform inner diameter, a single sleeve bearing of porous material rigidly retained within the bearing support, thrust bearing means at each end of said sleeve bearing and within said bearing support, and a rotor assembly including an end plate, a shaft supported at one end in said end plate and extending perendicularly therefrom, and an annular rotor fixed at one end to said end plate in concentric relation to said shaft, said stator means and said rotor assembly adapted to be operatively assembled with said shaft rotatably supported by said bearing and said rotor surrounding and radially spaced from said tubular bearing support and within said annular stator.

2. An electric motor construction according to claim 1 wherein said stator housing and said tubular bearing support are formed of material having good thermal conductivity and are in thermal contact with each other.

3. An electric motor construction according to claim 1 wherein said housing includes a central bore in which one end of said tubular bearing support is firmly received.

4. An electric motor construction of limited axial length comprising, a housing having a cylindrical outer wall, a tubular bearing support extending axially from said housing within said outer wall and concentric therewith, bearing means in said support, annular motor stator means carried by said outer wall and extending axially beyond it, a cup-shaped rotor hub having a substantially circular end wall and a cylindrical side wall, a shaft extending from said end wall along the axis of said rotor hub and supported from said end wall over a substantial portion of its length, an annular rotor fixed at one end to said end wall in concentric relation to said shaft and within said annular stator means, said tubular support and bearing means being of a length to receive substantially all of the unsupported portion of said shaft, said rotor surrounding said tubular support in spaced, concentric relation, and the side wall of said rotor hub enclosing a substantial portion of the motor stator means extending axially beyond the outer wall of said housing.

5. An electric motor construction according to claim 4 wherein said rotor hub end wall includes inner and outer axially extending sleeves, said shaft being firmly received within said inner sleeve and said rotor being supported between said inner and outer sleeves.

6. An electric motor construction according to claim 5 wherein in assembled position, said inner sleeve and said tubular bearing support are in substantial axial alignment and there is provided resilient sealing means between the opposed ends thereof.

7. An electric motor construction according to claim 6, wherein said housing and said bearing support are formed of material having high thermal conductivity and are in good thermal contact with each other.

References Cited

UNITED STATES PATENTS

| | | | |
|---|---|---|---|
| 2,234,571 | 11/1932 | McCormack. | |
| 2,904,709 | 9/1959 | Lautner | 310—90 |
| 2,928,960 | 3/1960 | Macks | 310—90 |
| 3,196,301 | 7/1965 | Turk | 310—90 |
| 3,284,650 | 11/1966 | Franz | 310—90 |
| 3,307,057 | 2/1967 | Papst | 310—90 |
| 3,319,098 | 5/1967 | Hartman | 310—90 |
| 3,387,153 | 6/1968 | Grad | 310—90 |

MILTON O. HIRSHFIELD, Primary Examiner

B. A. REYNOLDS, Assistant Examiner

U.S. Cl. X.R.

310—265